(No Model.)

E. S. LEAYCRAFT.
COMBINED CAR FENDER AND BRAKE.

No. 577,044.  Patented Feb. 16, 1897.

WITNESSES:
D. A. Hayward
Wm. A. Pollock

INVENTOR
Edwin S. Leaycraft,
BY
Edwin H. Brown
HIS ATTORNEY

UNITED STATES PATENT OFFICE.

EDWIN S. LEAYCRAFT, OF JERSEY CITY, NEW JERSEY.

COMBINED CAR FENDER AND BRAKE.

SPECIFICATION forming part of Letters Patent No. 577,044, dated February 16, 1897.

Application filed July 15, 1895. Renewed December 28, 1896. Serial No. 617,291. (No model.)

*To all whom it may concern:*

Be it known that I, EDWIN S. LEAYCRAFT, of Jersey City, in the county of Hudson and State of New Jersey, have invented a certain new and useful Improvement in a Combined Car-Fender and Brake, of which the following is a specification.

My invention relates to a combined fender and brake for moving vehicles, in operative connection one with the other.

I will describe a combined fender and brake embodying my improvement, and then point out the novel features in the claims.

Figure 1:
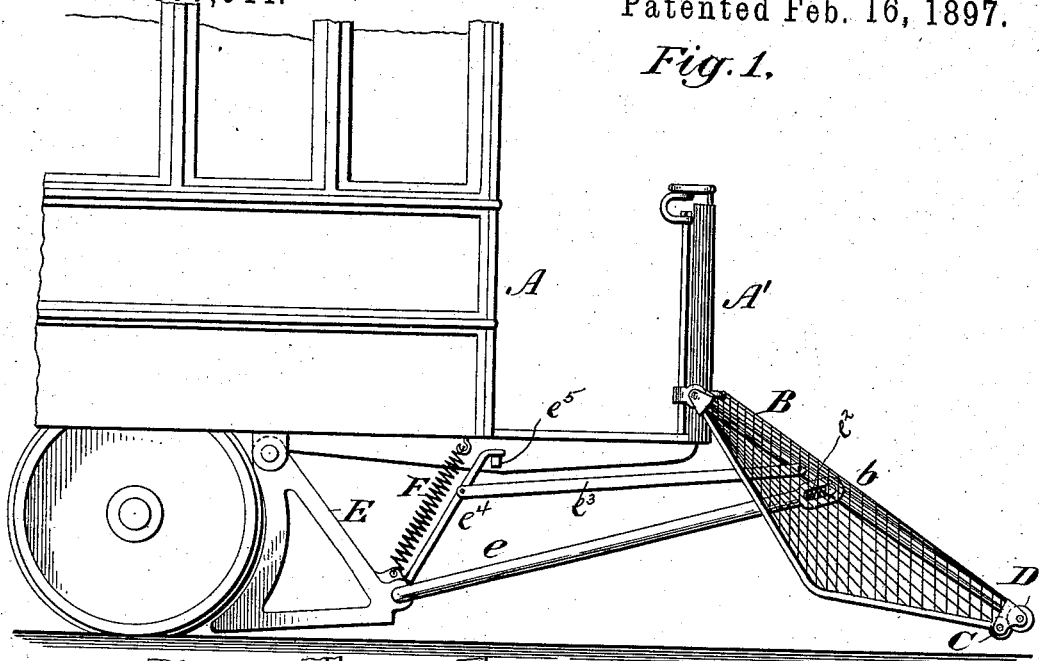
Figure 2:
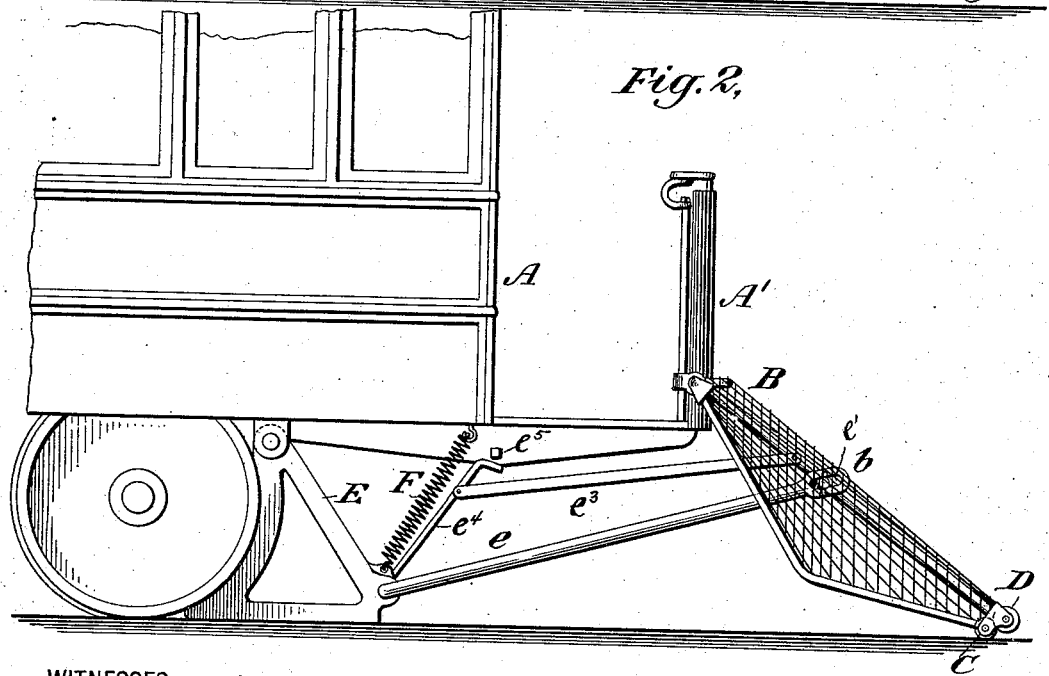

In the accompanying drawings, Figure 1 is a side elevation of a portion of a car to which is applied a fender and brake embodying my improvement, the parts being shown in a position in which the brake is released from the wheel of the car. Fig. 2 is a view similar to Fig. 1, but shows the parts in a position in which the brake is applied.

Similar letters of reference designate corresponding parts in both figures.

A represents a portion of a car, A' being the platform thereof.

B is a fender or guard having a hinged connection with the front portion of the car and extending forwardly and downwardly and terminating in close proximity to the track. This fender may consist of an apron comprising in its construction suitable side bars $b$ and open-work material filling the space between the boundaries of the fender.

At its forward or advancing edge the fender is provided with a roller C for supporting this portion of the same when the fender is in its depressed position, the roller then resting upon and rolling along the track.

D is an auxiliary roller or drum placed in advance of the roller C, a little above the same and resting upon the periphery of that roller. Consequently when the fender is depressed and the roller C is resting upon the track the roller D will be revolved as the car moves forward. The upper surface of the latter roller will revolve toward the fender, materially assisting the movement of an obstruction against which the roller may impinge into the fender. Preferably the roller D will comprise a cylinder of flexible material filled with air and forming a pneumatic cushion.

E is a brake-shoe pivotally supported in close proximity to the wheel-tread. To its lower portion is pivoted a link $e$, whose opposite extremity is pivotally connected to the fender, the brake-shoe and fender being thus swung upon their connection simultaneously. Preferably to assist in checking the movement of the car the brake-shoe will have a lower surface adapted to engage with the track simultaneously with its engagement with the wheel-tread, as shown in Fig. 2.

Of course the brake-shoe and its accessories may be duplicated for each side of the car.

F is a spring secured at one extremity to the brake-shoe E and at the opposite extremity to a stationary part of the car, its function being that of normally withdrawing the brake-shoe from contact with the wheel-tread, but permitting the same to be applied thereto by an abnormal force exerted through the link $e$.

Ordinarily the fender is elevated from the track at its forward end and the brake-shoe is out of contact with the wheel, the several parts being so proportioned that the fender has but a short distance to swing to place the roller C upon the track. Upon an impingement of the fender against an obstruction, however, the fender is depressed, and simultaneously with this movement the brake is applied to the car wheel or wheels.

It is desirable that the brake-shoe should not be depressed against the wheel-tread or be vibrated upon its support corresponding with a similar movement of the fender upon its support, owing to the swaying of the car as it moves rapidly forward. To obviate this, I may slot the end of the link $e$, as shown at $e'$, a pin on the fender-frame entering this slot and being resiliently thrust toward one end of the same by the interposed spring $e^2$. The fender may now vibrate to a considerable extent independently of the brake-shoe; but upon an excessive movement of the fender, as by striking an obstacle, I provide the following means for disengaging the brake-shoe: A link $e^3$, pivoted at one end to the fender and at the opposite end to a hooked bar $e^4$, normally supports the brake-shoe on the pin $e^5$. When disengaged from the pin $e^5$ by the fender, the brake-shoe will be in a position to engage the wheel-tread.

Having described my invention, what I consider as new, and desire to secure by Letters Patent, is—

1. The combination, with a car, of a fender, a brake-shoe and a link pivoted to the brake-shoe and provided with an elongated slot embracing a pin extending from the fender, substantially as and for the purpose set forth.

2. The combination with a car, of a brake-shoe, a fender, a connection between the brake-shoe and the fender permitting the latter to vibrate to a limited extent independently of the former, but forming a rigid connection to force the brake-shoe into action upon an abnormal movement of the fender, a catch for normally holding the brake-shoe away from the wheel, and means for disengaging said catch, substantially as specified.

3. The combination with a fender of a pneumatic roller journaled at the front edge of the fender, substantially as specified.

4. The combination with a car, of a fender, a brake-shoe, a catch for normally holding the brake-shoe away from the wheel, means for disengaging said catch, and a link connecting the brake-shoe with the fender with which latter it has a resilient connection, substantially as specified.

In testimony whereof I have signed my name to this specification in the presence of two subscribing witnesses.

EDWIN S. LEAYCRAFT.

Witnesses:
JOHN B. BOYD,
DAVID D. COWLEY.